United States Patent Office 2,827,501
Patented Mar. 18, 1958

2,827,501

PROCESS OF PRODUCING PURE TECHNICAL GRADE γ-HEXACHLORO-CYCLOHEXANE

Bruno Walach and Helmut Kudszus, Ingelheim (Rhine), Germany, assignors to C. H. Boehringer Sohn, Ingelheim (Rhine), Germany, a partnership consisting of Albert Boehringer, Ernst Boehringer, Ilse Liebrecht (born Boehringer), and Julius Liebrecht No Drawing. Application February 24, 1953
Serial No. 338,518

Claims priority, application Germany February 23, 1952

14 Claims. (Cl. 260—648)

The present invention relates to a process of producing pure technical grade γ benzene hexachloride from crude mixtures of isomers of γ benzene hexachloride, low in δ-isomer. The invention is particularly applicable to isomer mixtures containing less of α and β than is found in the total chlorination product of benzene and chlorine. By the term "pure technical grade γ benzene hexachloride" used hereinafter is understood a substantially pure γ benzene hexachloride containing at least 95% of said γ benzene hexachloride. ("γ" means gamma.)

It is known that on reacting benzene with chlorine to obtain principally benzene hexachloride, the insecticidal γ-isomer of benzene hexachloride is formed only to an extent of less than 20%, usually 12% to 14%. The total reaction product, commonly referred to in the art as crude benzene hexachloride includes α-, β-, γ-, and δ benzene hexachloride, higher chlorinated cyclohexanes, and other by-products. It is, therefore, a special technical task to separate the valuable γ-isomer in a simple, economic, and effective manner from its accompanying substances and to isolate it in pure state.

Most of the processes heretofore suggested for this purpose consist in fractional crystallization from suitable solvents or solvent mixtures. But the methods of isolating the pure γ-isomer from said crude benzene hexachloride are very cumbersome and complicated and lead to considerable losses. It is not particularly difficult to eliminate the β- and δ benzene hexachloride since the former is a very difficultly soluble compound and the latter a very readily soluble one. The δ benzene hexachloride can be removed in a simple manner, for instance, by dissolving in a small amount of a solvent. In this way, crude concentrates are obtained which mainly contain α- and γ benzene hexachloride and, besides, only a small amount of β benzene hexachloride and also only very little δ benzene hexachloride or none at all.

Fractions which are rich in γ-isomer precipitate from a solution saturated with said crude concentrate while the other isomers remain in solution in the mother liquor. The improvement achieved in the purification process, thus, depends upon the solubility of the mixture of isomers and upon the rate of crystallization of the γ-isomer from the solution. Since on cooling such a solution the γ-isomer begins to crystallize before the α-isomer, it is possible to precipitate the former at a preferred rate from solutions initially super-saturated with α-, β-, and γ-isomers. After separation of the crystals of the γ-isomer, mother liquors are obtained which, in their composition with respect to the γ-isomer, are approximately in the equilibrium of solubility while they are still supersaturated with respect to the α- and β-isomer.

Hence, for an effective separation of the γ-isomer a solvent is preferred which dissolves especially large amounts of the γ-isomer but which takes up only as little as possible of the other isomers. Furthermore, the solvent must be such that on cooling the super-saturated solution, crystallization of a substantially pure γ-isomer occurs before crystallization of other isomers. Methanol is an especially suitable solvent.

The present invention is based in part upon the fact that the solubility of the isomers of benzene hexachloride increases with increasing temperature. Thus, for instance, saturated solutions of the crude concentrate of the α- and γ-isomers in methanol have, at 50° C., a concentration of about 20% while their concentration is about 41% at the boiling point of the solvent, whereby the proportion of the individual isomers is not essentially changed.

This invention is more particularly based upon the fact that at temperatures above the normal atmospheric boiling point of the particular solvent used, the solubility is considerably increased. At the lower temperatures, say up to about 55°–60° C., the increase in solubility is rather moderate, but above this temperature the solubility rises sharply. The solubility of a crude concentrate consisting of α- and γ benzene hexachloride as well as the solubilities of γ benzene hexachloride and of α benzene hexachloride in methanol as solvent are dependent upon the temperature.

Hence, each degree of temperature increase at temperatures above 60° C. is of considerable importance.

Now, it has been found that pure, technical grade γ benzene hexachloride can be obtained from a concentrate consisting of α-, β-, and γ benzene hexachloride which is poor in or free of δ benzene hexachloride, by fractional crystallization of a solution of said crude concentrate in methanol, when using for dissolving the crude mixture methanol, the boiling point of which has been increased by certain additions thereto or by increasing the pressure to substantially above atmospheric, saturating said methanol at the temperature to which its boiling point is increased, with the crude concentrate, and subsequently cooling the solution obtained thereby to a temperature at which the γ-isomer crystallizes but not the α- and β-isomers.

The boiling point of said methanol can be increased either by heating under pressure, or by the addition of suitable compounds which are capable of increasing the boiling point.

On extracting, for instance, the crude concentrate with methanol as solvent at 71° C. under pressure, instead of at boiling temperature of 66° C. under normal conditions, the concentration of the mixture of isomers of benzene hexachloride in the solution increases from 41% to 55%, and at 74° C. to 58%. After separating such a solution from undissolved residue and cooling, for instance, to 45° C., considerable amounts of γ-benzene hexachloride and substantially no α-isomer precipitate. The crystallisate obtained from said highly concentrated solutions is of surprisingly high purity. Hence, in this manner considerably less of the other isomers is precipitated from the super-saturated solution than according to the processes used heretofore; more particularly, the α-isomer remains in solution.

As working under pressure is sometimes inconvenient, it is under certain circumstances more expedient to effect an increase of the boiling point by the addition of suitable substances. Such substances, however, must not impair, at the same time, the dissolving properties of the solvent used. It has been found that compounds are especially suitable for this purpose which, besides possessing favorable cryoscopic properties, have a vapor pressure as low as possible. The following compounds may be mentioned as examples: alkylated aromatic hydrocarbons of the benzene series having 7 to 9 carbon atoms, such as toluene and xylene; halogenated hydrocarbons having 6 to 9 carbon atoms and 1 to 3 halogen atoms, such as mono-, di- and tri-chlor benzene and toluene; hydroaromatic hydrocarbons having from 10 to 20 carbon atoms, such as decahydronaphthalene; and cyclic ketones having from 6 to 9 carbon atoms, such as cyclohexanone, methylcyclohexanone, and the like.

Said substances are added in amounts of, for instance, 2% to 15% by weight of said solvent thereby increasing the boiling point of the methanol to any desired extent. In this manner solutions are obtained which contain at least 45% of the mixture of isomers and which, on cooling, precipitate considerable amounts of a very pure $\gamma$-benzene hexachloride.

The boiling point of the solvent can also be increased by a combination of both features, namely by employing pressure and by adding a boiling point increasing substance.

The mother liquor from the crystallization, which is, with respect to the $\gamma$-isomer, to a large extent, in its equilibrium of solubility corresponding to the chosen crystallization temperature, is substantially super-saturated with respect to the $\alpha$- and $\beta$-isomers. Thus, in the example mentioned in column 2, lines 43–57, the solution is, with respect to the $\gamma$-isomer, approximately in its equilibrium of solubility at 45° C. and, with respect to the other isomers, in a state corresponding to the equilibrium at 71° C. If such a mother liquor is again used for dissolving further amounts of crude concentrate at a temperature of 71° C., it can, consequently, only take up $\gamma$-isomer, while it can not dissolve any more $\alpha$- and $\beta$-isomers. Hence, the amount of $\alpha$- and $\beta$-isomers which was dissolved once, remains practically constant with each new application of the mother liquor.

Methanol is an especially suitable solvent for carrying out the process according to the present invention, but other low molecular alcohols are also suitable solvents. Furthermore, mixtures of various low molecular alcohols may also be used. Included are those monohydric alcohols having from 1 to 6 carbon atoms.

The process according to this invention is preferably carried out in such a manner that the mother liquor of a previous crystallization is used for dissolving further amounts of crude concentrate. In this manner the process may also be conducted in a continuous operation.

The saturated solution is preferably cooled to a temperature of between 40° C. and 50° C. and most suitably to a temperature of about 45° C.

The readily soluble $\delta$-benzene hexachloride also causes an increase in the boiling point of the solvent used. In this case, it has been found, however, that the process yields satisfactory results only if the content in $\delta$-benzene hexachloride does not exceed certain limits. Therefore, crude concentrates, poor in $\delta$-isomer, are preferably used for carrying out the process according to this invention, i. e. the amount of $\delta$-benzene hexachloride must not exceed 5% of the amount of $\gamma$-benzene hexachloride present therein.

On repeated use of the same mother liquor, the $\delta$-benzene hexachloride must not be enriched to such an extent that the content of $\gamma$-benzene hexachloride in the mixture of isomers dissolved in the mother liquor would be reduced to below about 50%. Should this happen, part of the mother liquor is preferably removed from the cycle and is replaced by a solution free of $\delta$-benzene hexachloride.

By the process according to the present invention the advantageous dissolving properties of the low molecular alcohols and their favorable behavior with regard to the crystallization of $\gamma$-benzene hexachloride are utilized, whereby at the same time the effect is achieved by the increase in boiling point that the solvent is capable of dissolving considerably larger amounts of the crude concentrate. It is, thus possible to recover a considerably greater amount of $\gamma$-benzene hexachloride from the crude concentrate than heretofore possible, by means of a smaller amount of solvent and without the use of complicated apparatus. The $\gamma$-benzene hexachloride obtained in this manner is furthermore of particular purity. A further advantage of the process according to this invention consists in the fact that it may also be carried out in continuous operation.

The following examples are intended to illustrate the invention.

Example 1

100 parts of a crude concentrate substantially free of $\delta$-benzene hexachloride and containing 61.5% of $\gamma$-benzene hexachloride are extracted with a mixture of 60 parts of methanol and 10 parts of technical grade trichlorbenzene while boiling. The boiling point of the solution is 68° C. The hot extract having a concentration of the isomer mixture of about 53% is separated from the insoluble residue and is cooled to induce crystallization. The mother liquor is withdrawn from the precipitated crystals at 40° C. The precipitated crystals comprise 32 parts of a 95% $\gamma$-benzene hexachloride. 117 parts of a mother liquor having a $\gamma$-benzene hexachloride content of 26.5% and a concentration of about 40% in all isomers present remain. When saturating said mother liquor again with $\gamma$-isomer in a new extraction of a crude concentrate free of $\delta$-isomer, on subsequent crystallization, pure technical grade $\gamma$-benzene hexachloride is obtained in almost quantitative yield based upon the newly extracted $\gamma$-isomer.

Example 2

100 parts of a crude concentrate poor in $\delta$-benzene hexachloride (poor in $\delta$-isomer means less than 5% of $\delta$-benzene hexachloride in relation to the $\gamma$-content), containing 61% of $\gamma$-benzene hexachloride and 0.5% of $\delta$-benzene hexachloride, are extracted with 60 parts of methanol and 5 parts of decahydronaphthalene while boiling. The boiling point of the solvent is 68° C. and a 52% solution of all isomers is obtained. On cooling to 43° C. pure technical grade $\gamma$-benzene hexachloride crystallizes. The remaining mother liquor is again saturated at a temperature of 68°–70° C. with crude concentrate yielding a 53–55% solution. On cooling to 45° C., a 96–97% $\gamma$-benzene hexachloride crystallizes in almost quantitative yield based upon the newly dissolved $\gamma$-benzene hexachloride.

Example 3

100 parts of a crude concentrate poor in $\delta$-isomer and containing 61.5% of $\gamma$-benzene hexachloride is extracted with 60 parts of methanol and 10 parts of xylene at the boiling point. The boiling point of the solution is 67° C. The hot extract has a concentration of 53% and is further treated as in Examples 1 and 2. At 42° C., 31 parts of an about 95% $\gamma$-benzene hexachloride is obtained. By returning the mother liquor from the crystallization to the extraction, an almost quantitative yield based on the newly extracted $\gamma$-isomer is obtained.

Example 4

100 parts of a crude concentrate poor in $\delta$-isomer and containing 61.5% of $\gamma$-benzene hexachloride is extracted with 60 parts of methanol and 5 parts of cyclohexanone at the boiling point. The boiling point of the solution is 68° C. and the concentration of the hot extract is 56%. After cooling to 45° C. there is obtained 30 parts of an about 97% $\gamma$-benzene hexachloride. The return of the mother liquor into the operation is as set forth in the preceding examples.

Example 5

A crude concentrate poor in $\delta$-isomer and containing 61.5% of $\gamma$-benzene hexachloride is extracted with methanol under pressure at a temperature of 70–71° C. until the solution is saturated. It is separated from undissolved residue and allowed to crystallize at about 45° C. A 95% $\gamma$-benzene hexachloride precipitates. The mother liquor containing 23–24% of $\gamma$-benzene hexachloride and having a 43% concentration of all isomers is used for a subsequent extraction of γ-benzene hexachloride from a crude concentrate poor in δ-benzene hexachloride at 71° C. under pressure. On cooling the solution to 46° C. a 97% γ-benzene hexachloride crystallizes in a yield of about 96%.

What is claimed is:

1. Process for producing pure technical grade gamma-benzene hexachloride from a mixture of benzene hexachloride isomers, the gamma isomer being present in a proportion substantially greater than that in crude benzene hexachloride, and the proportion of delta isomer present being less than that in crude benzene hexachloride which comprises dissolving said mixture in methanol, the boiling point of which is raised above the normal atmospheric boiling point, saturating said solvent with said mixture at a temperature substantially above said normal boiling point, cooling said solution to a temperature at which said gamma isomer crystallizes but at which the other isomers remain in solution, and recovering said gamma isomer from the mother liquor.

2. Process according to claim 1, characterized in that the boiling point of the solvent is increased by increased pressure.

3. Process according to claim 1, characterized in that the boiling point of the solvent is increased by dissolving other inert substances therein.

4. Process according to claim 3, characterized in that said substances are taken from the class consisting of alkylated aromatic hydrocarbons having 7 to 9 carbon atoms, halogenated aromatic hydrocarbons containing 1 to 3 halogen atoms, hydroaromatic hydrocarbons having at least 10 carbon atoms, and cyclic ketones having at least 6 carbon atoms.

5. Process according to claim 3, characterized in that from 2 to 15% of said substances is used.

6. Process according to claim 3, characterized in that said substance is trichlorobenzene.

7. Process according to claim 3, characterized in that said substance is decahydronaphthalene.

8. Process according to claim 3, characterized in that said substance is xylene.

9. Process according to claim 3, characterized in that said substance is cyclohexanone.

10. Process according to claim 1, characterized in that the boiling point is increased by increased pressure and by dissolving other inert substances in said solvent.

11. Process according to claim 1, characterized in that the solution saturated with the mixture of isomers at the increased boiling point of the solvent is cooled to a temperature of about 40° C. to 50° C. to cause crystallization.

12. Process according to claim 1, characterized in that in said crude mixture a content of δ-isomer less than 5% based on the γ-isomer is present.

13. Process according to claim 1, characterized in that the mother liquor of a previous crystallization is used as solvent.

14. Process according to claim 1, characterized in that the process is carried out in continuous operation.

References Cited in the file of this patent

UNITED STATES PATENTS

| | | |
|---|---|---|
| 2,553,956 | Burrage et al. | May 22, 1951 |
| 2,574,165 | Bender et al. | Nov. 6, 1951 |
| 2,718,531 | Berl et al. | Sept. 20, 1955 |

FOREIGN PATENTS

| | | |
|---|---|---|
| 491,132 | Belgium | Mar. 16, 1950 |
| 680,955 | Great Britain | Oct. 15, 1952 |